May 18, 1965     K. E. SUNDSTROM     3,183,764
AUTOMATIC SLIT CONTROL FOR ANALYZERS
Filed Nov. 21, 1960
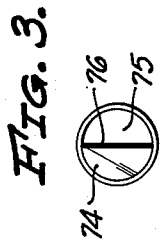
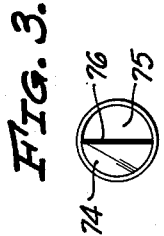
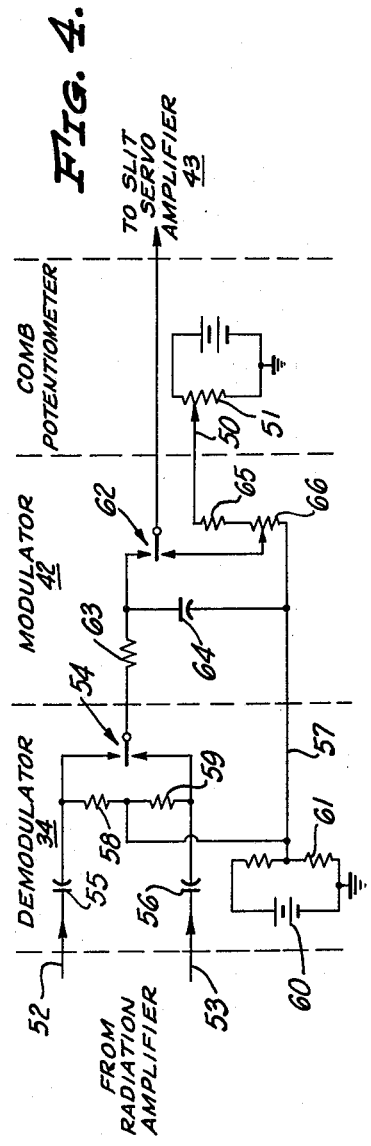
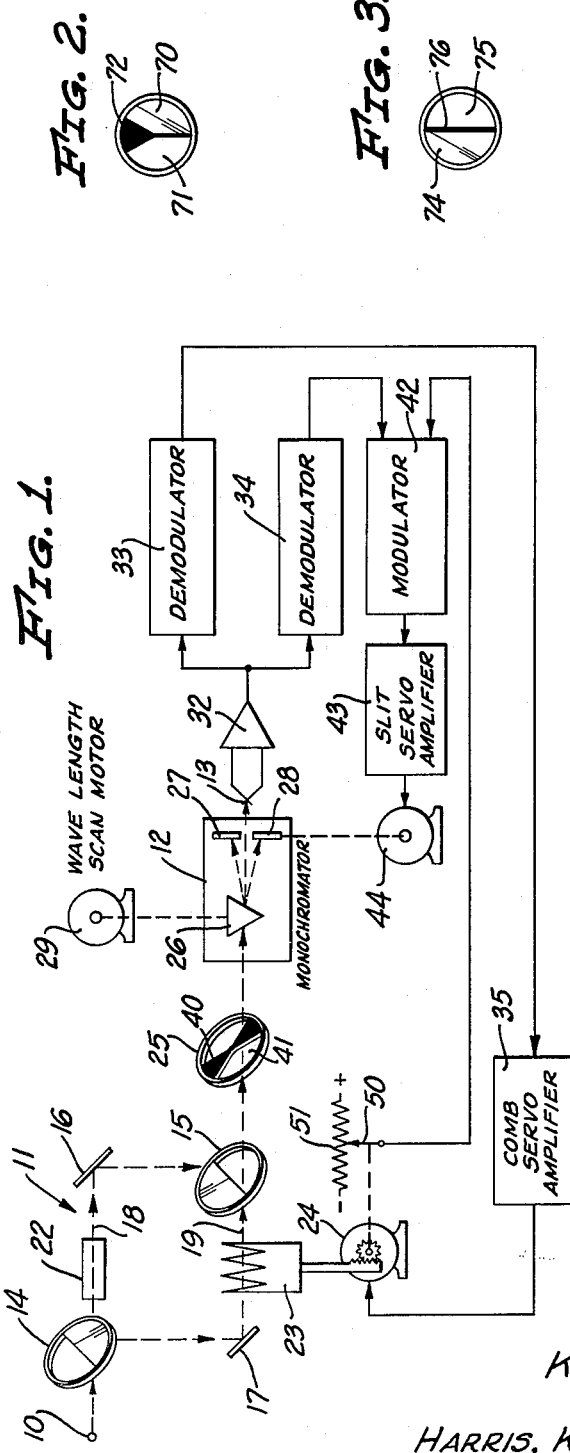
INVENTOR
KARL E. SUNDSTROM
BY HIS ATTORNEYS
HARRIS, KIECH, RUSSELL & KERN United States Patent Office 3,183,764
Patented May 18, 1965

3,183,764
AUTOMATIC SLIT CONTROL FOR ANALYZERS
Karl Erik Sundstrom, La Habra, Calif., assignor to Beckman Instruments, Inc., a corporation of California
Filed Nov. 21, 1960, Ser. No. 70,733
6 Claims. (Cl. 88—14)

This invention relates to analyzers of the double beam, optical null type such as spectrophotometers utilizing beam intensity balancing, and in particular, to new apparatus for improving the sensitivity and accuracy of such instruments.

In analyzers of this type, radiation from a source is switched along two paths and recombined at a thermocouple or other electrical signal generator. A sample to be analyzed is placed in one path and the error signal is used to drive a servo which varies the intensity of the beam in the other path to achieve a null or zero signal at the thermocouple. The servo position is a measure of the sample content. Ordinarily, the wavelength of the radiation source is scanned over a range by a monochromator during the measurement to provide a spectrum measure of the sample. The sensitivity and accuracy of the instrument is affected by variations in loop gain of the attenuator servo loop which includes the optical path, the electrical circuitry and the servo motor. Accordingly, it is an object of the present invention to provide an apparatus for keeping the loop gain of the attenuator servo loop constant.

It is an object of the invention to provide an appartus for automatically controlling the gain of the attenuator servo loop of an analyzer. A further object is to provide such apparatus wherein the gain is controlled by controlling the total radiation arriving at the thermocouple, as by controlling the slit width in the monochromator. Another object is to provide such apparatus which is operable for all values of attenuation provided by the reference beam attenuator.

It is an object of the invention to provide an automatic attenuator loop gain control in which the gain-varying actuator is energized as a function of total radiant energy at the thermocouple and of the magnitude of attenuation in the reference beam path to make the gain control operation independent of attenuator position. A particular object of the invention is to provide such apparatus whereby the signal-to-noise ratio is not increased by the gain control operation, even for very high attenuation positions of the attenuator in the reference beam path.

It is a specific object of the invention to provide a double beam, optical null analyzer having beam control means for directing radiation from the source through the monochromator to the sensing unit alternately along reference and sample paths producing radiation at the sensing unit having a first component cyclically varying as a function of the energy in the reference path and the energy in the sample path respectively, and having a second component varying as a function of the energy in the combined paths, attenuator circuit means responsive to the first component for actuating the attenuator drive producing an attenuator feedback loop to control the energy in the reference path beam and balance the energies in the paths, and slit circuit means responsive to the second component for actuating the slit jaw drive to control the total energy at the sensing unit and maintain the loop gain of the attenuator feedback loop constant. A further object is to provide such an analyzer including means for generating an attenuator signal which varies as a function of reference beam attenuation produced by the attenuator, with the slit circuit means responsive to the second component of the sensing unit signal and to the attenuator signal.

It is another object of the invention to provide such an analyzer wherein the beam switching and beam interrupting can be performed by the same apparatus or by two sets of apparatus positioned along the beam path. Another object is to provide an analyzer wherein the beam switching is carried out at a particular frequency and phase timing and the beam interrupting is carried out at a different timing which may vary in phase, or frequency, or both. A specific object is to provide apparatus wherein the second component timing is at double the frequency of the first component. Another specific object is to provide apparatus wherein the second component timing is at the frequency of the first component but in quadrature.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:

FIG. 1 is a block diagram of a spectrophotometer incorporating the gain control of the invention;

FIGS. 2 and 3 show alternative forms of switching mirrors; and

FIG. 4 is a schematic diagram of a preferred circuit for the gain control.

The instrument of FIG. 1 includes a source 10, a beam switching system 11, a monochromator 12 and a thermocouple 13. The source 10 may be any suitable device which produces radiation over the spectrum being analyzed. The beam-switching system includes half mirrors 14, 15 which are rotated in synchronism, and reflecting mirrors 16, 17, providing a sample beam path 18 and a reference beam path 19. A sample cell 22 is positioned in the sample beam path 18 for containing the sample to be analyzed. Means for varying the intensity of the beam along the reference beam path 19 is positioned therein. A typical example is the attenuator or comb 23 which is driven into and out of the reference beam path by a motor 24.

A beam interrupter in the form of a segmented disc or chopper 25 is positioned between the half mirror 15 and the monochromator 12. The monochromator 12 includes means for dispersing the beam passing therethrough, shown here as a prism 26, and slit jaws 27, 28 defining a slit which permits only a small fraction of the dispersed beam to impinge on the thermocouple 13. The prism 26 is rotated by a scan motor 29 during the analysis to scan the entire spectrum of interest past the slit. A programmed change in scan speed over the spectrum is usually desired and is conventionally accomplished by coupling the motor to the prism or other dispersing element by means of a cam of appropriate contour.

The thermocouple 13 produces an electrical signal which is a function of the intensity of radiation impinging thereon. This signal is amplified in an amplifier 32 and is coupled to demodulators 33, 34. The electrical signal includes a first component which cyclically varies as a function of the energy in the reference path and the energy in the sample path. The demodulator 33 is operated in synchronism with the beam-switching drive for the mirrors 14, 15, ordinarily at the same frequency and phase, and produces an output signal which is a function of the first component. In a typical instrument, the beam switching frequency is at a rate of about five to twenty cycles per second and the demodulator 33 will be in the form of a mechanical chopper. The output from the demodulator 33 is amplified in comb servo amplifier 35 and used to energize the comb motor 24 for driving the comb 23 into and out of the reference path 19 to balance the energy in the two paths and reduce the first component of the signal to zero or a null value. The position of the comb is then a measure of the attenuation produced by the sample. With the exception of the beam interrupter 25 and the demodulator 34, the apparatus described above comprises a conventional double beam, optical null spectrophotometer.

The beam interrupter 25 has solid or opaque sections 40 and open or transparent sections 41, with the solid sections being small relative to the open sections. In one mode of operation, the beam interrupter 25 is operated at double the frequency of the beam switching half mirrors 14, 15. Then the electrical signal generated by the thermocouple 13 includes a second component which varies as a function of the total energy in the combined reference and the sample paths. The demodulator 34 is operated in synchronism with the drive for the beam interrupter 25, i.e., at double the frequency of the demodulator 33, and produces an output signal which is compared with a reference signal in a modulator 42. The output of the modulator 42 is coupled to a slit servo amplifier 43 for actuating a slit jaw servo motor 44 which derives the slit jaws 27, 28 to vary the slit width in the monochromator. The second input to the modulator 42 is a reference voltage which comes from the arm 50 of the potentiometer 51, the arm 50 being driven by the comb servo motor 24 so that the reference voltage varies with the position of the attenuator comb in the reference beam path. A preferred circuit for the demodulator 34 and modulator 42 is shown in FIG. 4.

The output from the amplifier 32 appears on lines 52, 53 which are coupled to the fixed contacts of a chopper 54 through capacitors 55, 56 respectively. The fixed contacts of the chopper 54 are connected to a reference point 57 through resistors 58, 59. The reference point 57 is maintained at +0.5 volt with respect to circuit ground by a voltage source 60 and a tapped resistor 61. This positive bias for the demodulator is utilized because the arm 50 of the comb potentiometer 51 produces a minimum reference voltage of 0.5 volt for zero transmission along the reference beam path. Of course, a zero reference voltage for zero transmission or any other reference voltage for zero transmission could be utilized.

The output of the demodulator 34 appears at the moving arm of the chopper 54 and is connected to one fixed contact of a chopper 62 through a resistor 63, with a filter capacitor 64 connected across the demodulator output. The moving arm 50 of the comb potentiometer 51 is connected to the reference point 57 through a fixed resistor 65 and another potentiometer 66. The arm of the potentiometer 66 is connected to the other fixed contact of the chopper 62 to provide the reference voltage for the modulator. The output of the modulator appears at the moving arm of the chopper and is connected as the input to the slit servo amplifier 43.

In one specific form of the circuit of FIG. 4, the beam-switching half mirrors and the demodulator 33 are operated at 11 cycles per second while the beam interrupter and the chopper 54 of the demodulator 34 are operated at 22 cycles per second. The chopper 62 of the modulator 42 is operated at 60 cycles per second. The capacitors 55, 56 and 64 are 0.047 microfarad, the resistors 58 and 59 are 200,000 ohms, the resistors 63 and 65 are 1.5 megohms, and the resistor 67 and potentiometer 66 are 1 megohm.

In the operation of the instrument, the comb 23 is moved in the reference beam path 19 to a position at which the radiant energy traversing the sample beam path 18 and the energy traversing the reference beam path 19 are equal, resulting in a zero or null value for the first component of the electrical signal generated by the thermocouple 13. Also, the slit jaws 27, 28 are moved to a position to control the total radiant energy arriving at the thermocouple 13 to a level such that the second component of the electrical signal produces a voltage at the modulator input equal to the reference voltage from the comb potentiometer. Under these circumstances, the gain around the comb or attenuator loop will be maintained constant. Furthermore, the slit width will not be changed when the attenuator position is changed although the total energy arriving at the thermocouple changes, since the reference voltage is also changed. Hence, the loop gain of the slit control loop is a function of the change in radiant energy due to changes in reference beam path attenuation produced for beam balancing purposes.

As an example, first consider the operation with no sample in the sample beam path. The attenuator comb will be fully withdrawn from the reference beam path and the first component of the signal will be zero or a null. The second component of the signal will generate a particular voltage at the modulator input which will be exactly balanced by the reference voltage from the comb potentiometer. Now assume that a sample which absorbs fifty percent of the energy is placed in the sample beam path. This will produce an unbalance in the first component of the signal resulting in insertion of the attenuator comb into the reference beam path to a position permitting only fifty per cent transmission of radiant energy. Then the first component will again be zero or null. However, the total energy arriving at the thermocouple will now be fifty percent of that originally received and the second component signal to the modulator will be reduced. However, the reference voltage supplied by the comb potentiometer will be similarly reduced so that the modulator output remains constant and the slit width remains unchanged.

However, when the total energy arriving at the thermocouple varies from some reason other than sample and comb absorption, the second component signal will change while the reference voltage remains constant, resulting in a change in slit width to maintain the loop gain constant.

Various alternative embodiments of the apparatus may be utilized. For example, the beam interrupter 25 may be driven at the same frequency as the beam-switching half mirrors but out of phase, ordinarily by 90°. Other variations in frequency and phase timing may be utilized, it only being necessary to produce two components which can be selected by appropriate timing of the corresponding demodulators. Also the beam-interrupting operation and the beam-switching operation can be accomplished by a single set of half mirrors. For example, partial mirrors of the form of FIG. 2 can be substituted for the half mirrors 14, 15, with the interrupter 25 being omitted. The structure of FIG. 2 includes a reflecting section 70, an open or transparent section 71, and an opaque section 72. The reflecting and transparent sections 70, 71 provide the beam-switching function of the half mirrors 14, 15. The opaque section 72 provides the beam-interrupting function which occurs at the same frequency at 90° or in quadrature with the beam switching. Another form of partial mirror is shown in FIG. 3. This structure includes a reflecting section 74, a transparent or open section 75, and an opaque section 76. The reflecting and open sections 74, 75 provide the beam-switching function while the opaque section 76 provides the beam-interrupting function, producing a double frequency second component. The opaque section 76 may merely constitute the edge of the reflecting section 74, but better performance is obtained by providing an opaque zone along the reflecting mirror.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a double beam, optical null analyzer having a radiation source, means defining reference and sample beam paths, a beam attenuator, an attenuator drive for positioning the attenuator in the reference beam path, a monochromator having jaws defining a beam slit, a slit jaw drive for varying the slit width, and a radiation sensing unit for generating an electrical signal as a function of radiant energy directed thereto, the combination of: beam control means for directing radiation from said source through said monochromator to said sensing unit alternately along said reference and sample paths producing radiation at said sensing unit having a first component cyclically varying as a function of the energy in said reference path and the energy in said sample path respectively, and having a second component varying as a function of the energy in the combined paths; attenuator circuit means responsive to said first component for actuating said attenuator drive producing an attenuator feedback loop to control the energy in the reference beam path and balance the energies in said paths; means for generating an attenuator signal which varies as a function of reference beam attenuation produced by said attenuator; means for comparing said second component and said attenuator signal; said slit jaw drive being responsive to the output of said comparing means to control the total energy at said sensing unit and maintain the loop gain of the attenuator feedback loop constant and independent of the attenuation produced by said attenuator.

2. In a double beam, optical null analyzer having a radiation source, means defining reference and sample beam paths, a beam attenuator, an attenuator drive for positioning the attenuator in the reference beam path, a monochromator having jaws defining a beam slit, a slit jaw drive for varying the slit width, and a radiation sensing unit for generating an electrical signal as a function of radiant energy directed thereto, the combination of: beam control means for switching radiation from said source through said monochromator to said sensing unit alternately along said reference and sample paths at a particular frequency and phase timing and interrupting the beam at another timing producing radiation at said sensing unit having a first component cyclically varying at said particular timing as a function of the energy in said reference path and the energy in said sample path respectively, and having a second component varying at said other timing as a function of the energy in the combined paths; a first demodulator operated at said particular timing and having said electrical signal as an input, said first demodulator producing an attenuator drive signal for actuating said attenuator drive to control the energy in the reference path beam and balance the energies in said paths; a second demodulator operated at said other timing and having said electrical signal as an input, said second demodulator producing a total energy signal; means for generating an attenuator signal which varies as a function of reference beam attenuation produced by said attenuator; and a modulator having said total energy signal and said attenuator signal as inputs and producing a slit drive signal for actuating said slit jaw drive to control the total energy received at said sensing unit.

3. In a double beam, optical null analyzer having a radiation source, means defining reference and sample beam paths, a beam attenuator, an attenuator drive for positioning the attenuator in the reference beam path, a monochromator having jaws defining a beam slit, a slit jaw drive for varying the slit width, and a radiation sensing unit for generating an electrical signal as a function of radiant energy directed thereto, the combination of: beam control means for switching radiation from said source to said sensing unit alternately along said reference and sample paths at a predetermined frequency and interrupting the beam at another frequency producing radiation at said sensing unit having a first component cyclically varying at said predetermined frequency as a function of the energy in said reference path and the energy in said sample path respectively, and having a second component varying at said other frequency as a function of the energy in the combined paths; a first demodulator operated at said predetermined frequency and having said electrical signal as an input, said first demodulator producing an attenuator drive signal for actuating said attenuator drive to control the energy in the reference path beam and balance the energies in said paths; a second demodulator operating at said other frequency and having said electrical signal as an input, said second demodulator producing a total energy signal; means for generating an attenuator signal which varies as a function of reference beam attenuation produced by said attenuator; and a modulator having said total energy signal and said attenuator signal as inputs and producing a slit drive signal for actuating said slit jaw drive to control the total energy received at said sensing unit.

4. In a double beam, optical null analyzer having a radiation source, means defining reference and sample beam paths, a beam attenuator, an attenuator drive for positioning the attenuator in the reference beam path, a monochromator having jaws defining a beam slit, a slit jaw drive for varying the slit width, and a radiation sensing unit for generating an electrical signal as a function of radiant energy directed thereto, the combination of: beam control means for switching radiation from said source to said sensing unit alternately along said reference and sample beam paths at a particular frequency and interrupting the beam at said frequency out of phase with the switching producing radiation at said sensing unit having a first component cyclically varying in phase with the switching as a function of the energy in said reference path and the energy in said sample path respectively, and having a second component varying in phase with the interrupting as a function of the energy in the combined paths; a first demodulator operated in synchronism with said switching and having said electrical signal as an input, said first demodulator producing an attenuator drive signal for actuating said attenuator drive to control the energy in the reference path beam and balance the energies in said paths; a second demodulator operated in synchronism with said interrupting and having said electrical signal as an input, said second demodulator producing a total energy signal; means for generating an attenuator signal which varies as a function of reference beam attenuation produced by said attenuator; and a modulator having said total energy signal and said attenuator signal as inputs and producing a slit drive signal for actuating said slit jaw drive to control the total energy received at said sensing unit.

5. In a double beam, optical null analyzer system, the combination comprising: a radiation source; means defining reference and sample beam paths; a beam attenuator; an attenuator drive for positioning the attenuator in the reference beam path; a monochromator; a radiation sensing unit for generating an electrical signal as a function of radiant energy directed thereto; beam control means for directing radiation from said source through said monochromator to said sensing unit alternately along said reference and sample paths producing radiation at said sensing unit having a first component and a second component; gain control means to adjust the loop gain of said system; means responsive to said first component for producing an attenuator drive signal for actuating said attenuator drive to position said attenuator in said reference beam path and balance the energy in said reference beam path with the energy in said sample beam path; means responsive to said attenuator position for producing a variable reference signal; means for comparing said second component with said reference signal; and means responsive to said comparison means for controlling said gain control means to maintain constant loop gain.

6. In a double beam, optical null analyzer system, the combination comprising: a radiation source; means defining reference and sample beam paths; a beam attenuator; an attenuator drive for positioning the attenuator in the reference beam path; a monochromator; a radiation sensing unit for generating an electrical signal as a function of radiant energy directed thereto; beam control means for directing radiation from said source through said monochromator to said sensing unit alternately along said reference and sample paths producing radiation and said sensing unit having a first component cyclically varying as a function of the energy in said reference path and the energy in said sample path respectively, and having a second component varying as a function of the energy in the combined paths; gain control means to adjust the loop gain of the system; means responsive to said first component for actuating said attenuator drive to position said attenuator in said reference beam path to balance the energy in said reference beam path with the energy in said sample beam path; means coupled to said attenuator drive for producing a variable reference signal representing the position of said attenuator; means for comparing said second component with said reference signal; and means responsive to said comparison means for controlling said gain control means to maintain constant loop gain.

References Cited by the Examiner

UNITED STATES PATENTS

| 2,900,866 | 8/59 | Coates et al. | 88—14 |
| 2,984,149 | 5/61 | Herscher et al. | 88—14 |

OTHER REFERENCES

Savitzky et al.: "A Ratio-Recording Double Beam Infra-Red Spectrophotometer Using Phase Discrimination and a Single Detector," The Review of Scientific Instruments, vol. 21, No. 3, March 1950, pp. 203–212.

JEWELL H. PEDERSEN, *Primary Examiner*.

EMILE G. ANDERSON, *Examiner*.